(12) United States Patent
Morimoto et al.

(10) Patent No.: US 7,467,079 B2
(45) Date of Patent: Dec. 16, 2008

(54) CROSS LINGUAL TEXT CLASSIFICATION APPARATUS AND METHOD

(75) Inventors: Yasutsugu Morimoto, Kodaira (JP); Hiroyuki Kaji, Tama (JP); Osamu Imaichi, Wako (JP)

(73) Assignee: Hitachi, Ltd., Tokyo (JP)

( * ) Notice: Subject to any disclaimer, the term of this patent is extended or adjusted under 35 U.S.C. 154(b) by 1073 days.

(21) Appl. No.: 10/784,833

(22) Filed: Feb. 24, 2004

(65) Prior Publication Data

US 2005/0071152 A1    Mar. 31, 2005

(30) Foreign Application Priority Data

Sep. 29, 2003   (JP)   ............... 2003-338177

(51) Int. Cl.
G06F 17/27 (2006.01)
G06F 17/20 (2006.01)

(52) U.S. Cl. .............................. 704/9; 704/8

(58) Field of Classification Search ............... None
See application file for complete search history.

(56) References Cited

U.S. PATENT DOCUMENTS

| | | | | |
|---|---|---|---|---|
| 5,541,836 A | * | 7/1996 | Church et al. | 704/7 |
| 5,794,050 A | * | 8/1998 | Dahlgren et al. | 717/144 |
| 6,006,221 A | * | 12/1999 | Liddy et al. | 707/5 |
| 7,318,022 B2 | * | 1/2008 | Li | 704/10 |
| 2002/0026456 A1 | * | 2/2002 | Bradford | 707/500 |

FOREIGN PATENT DOCUMENTS

| | | |
|---|---|---|
| JP | 6-348755 | 6/1993 |
| JP | 9-6799 | 6/1995 |
| JP | 11-39313 | 7/1997 |
| JP | 2001-331484 | 5/2000 |
| JP | 2003-76710 | 9/2001 |

OTHER PUBLICATIONS

IBM Technical Disclosure Bulletin, "Algorithms for Disambiguating Word Senses in Thesauri", Sep. 1992, vol. 35, Issue 4B, pp. 81-82.*

* cited by examiner

Primary Examiner—David R Hudspeth
Assistant Examiner—Brian L Albertalli
(74) Attorney, Agent, or Firm—Reed Smith LLP; Stanley P. Fisher, Esq.; Juan Carlos A. Marquez, Esq.

(57) ABSTRACT

A text classification apparatus directed to a plurality of languages, includes a unit for extracting information for converting a word from non-classified (unlabeled) texts, in a plurality of languages, into a word sense, a unit for learning a classification knowledge at a word sense level after converting a word extracted from a labeled text into a word sense, a unit for learning a classification knowledge at a word level from the labeled text, a unit for learning the classification knowledge at the word level from the classification knowledge at the word sense level and information on a relation between words extracted from the unlabeled text, and a unit for combining the respective classification knowledges to assign a category.

12 Claims, 12 Drawing Sheets

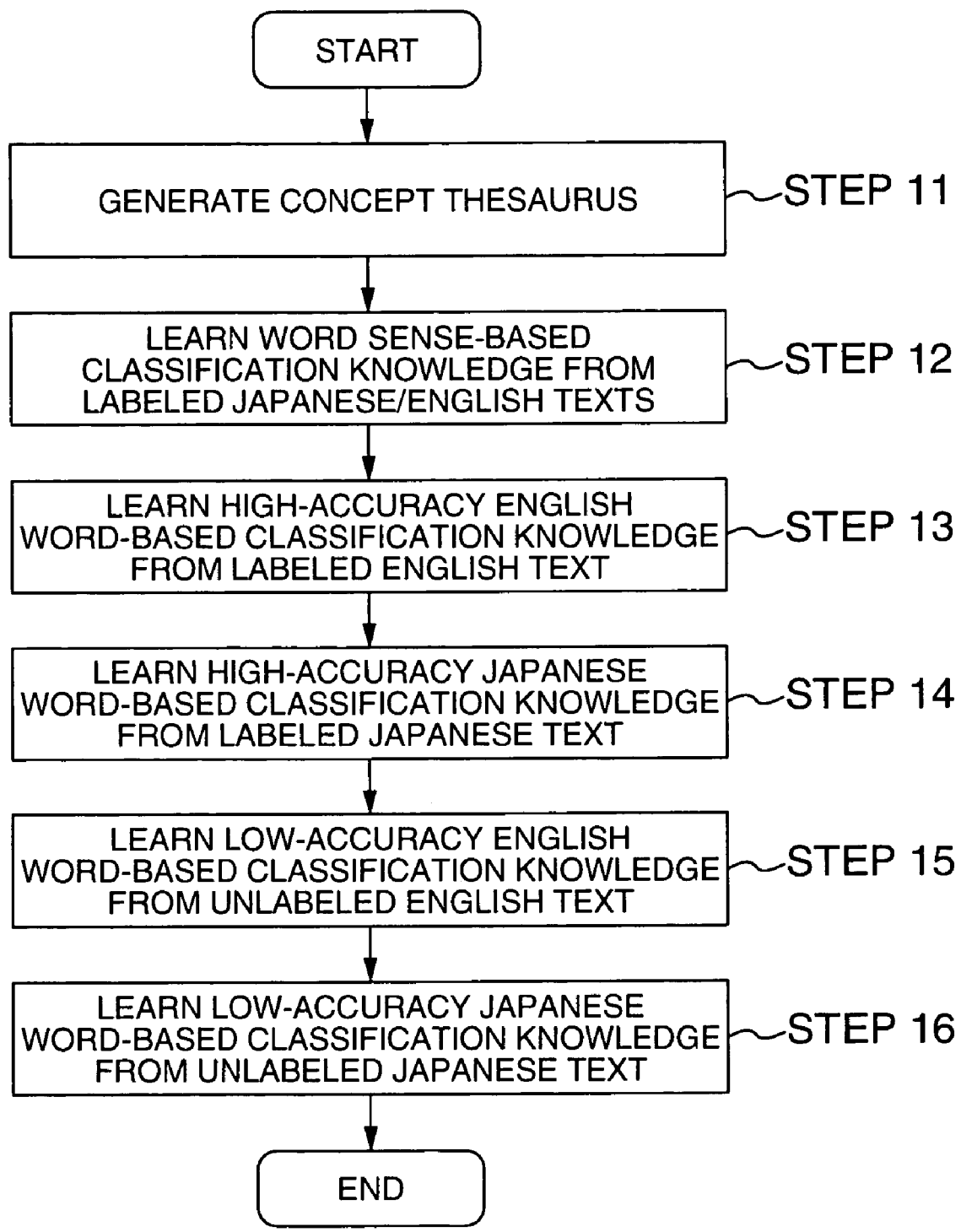

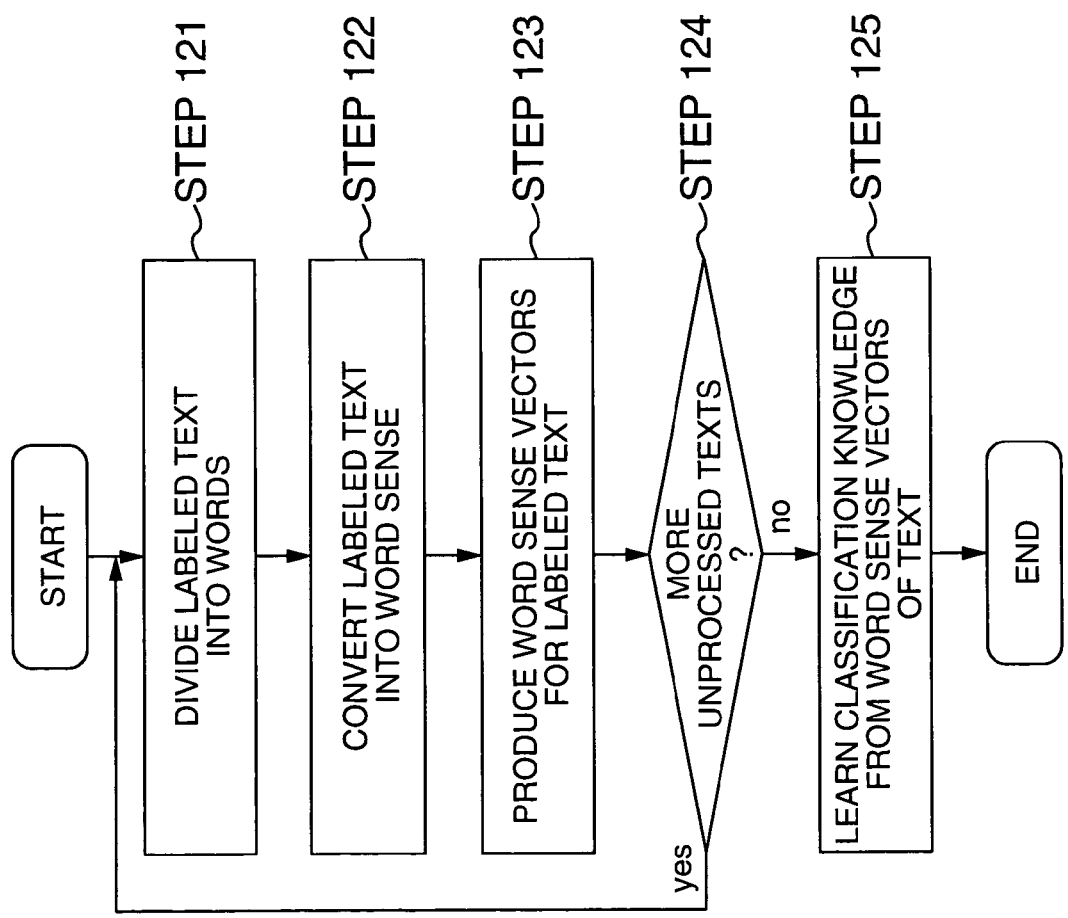

FIG. 8

| # | WORD | FREQUENCY |
|---|---|---|
| 1 | {coat,コート,皮膜} | 7 |
| 2 | {cover,カバーする,被覆する} | 16 |
| 3 | {material,材,材料} | 21 |
| 4 | {silicon,シリコン,ケイ素} | 6 |
| 5 | {water-shedding,撥水性} | 12 |
|  | ----- | ----- |

FIG. 9

| # | WORD | WEIGHT |
|---|---|---|
| 1 | {coat,コート,皮膜} | 0.8 |
| 2 | {cover,カバーする,被覆する} | 0.4 |
| 3 | {material,材,材料} | 0.3 |
| 4 | {silicon,シリコン,ケイ素} | 0.6 |
| 5 | {water-shedding,撥水性} | 0.7 |
|  | ----- | ----- |

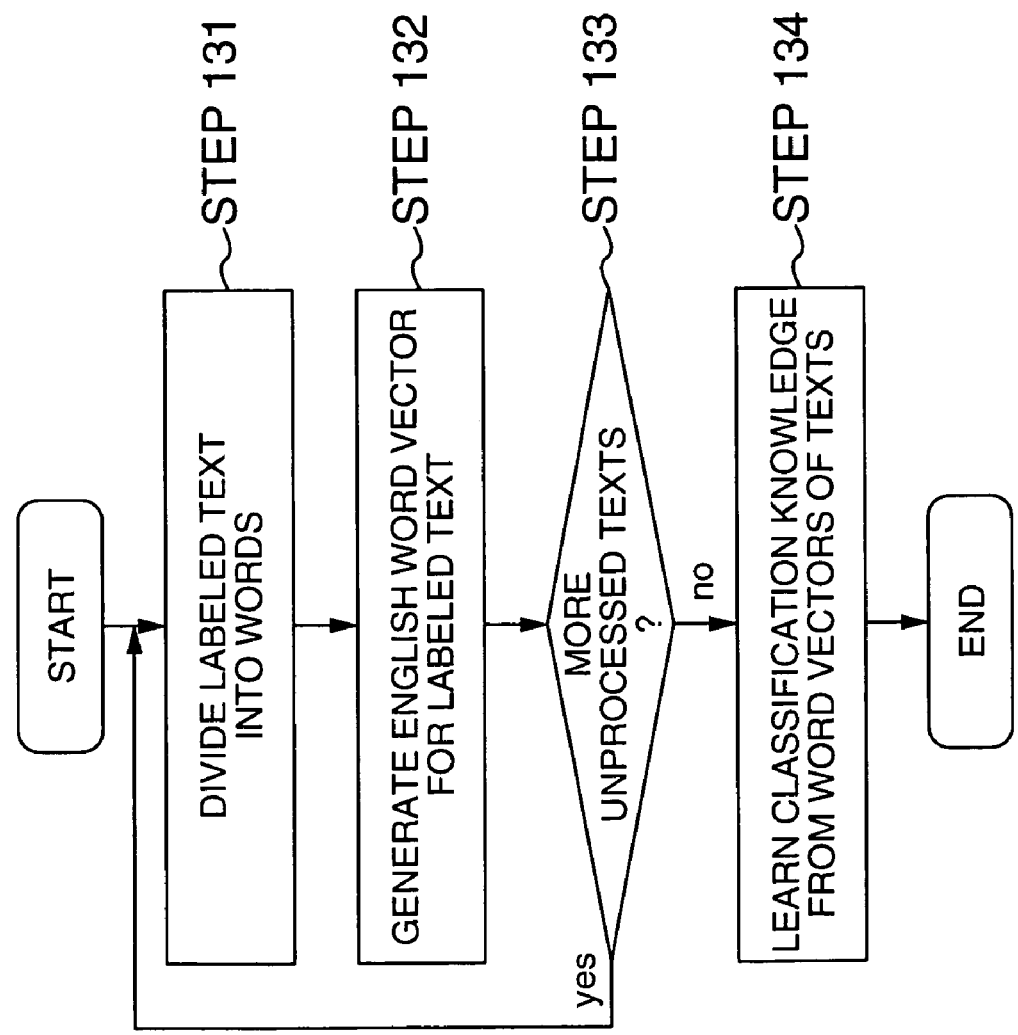

| # | WORD | FREQUENCY |
|---|------|-----------|
| 1 | coat | 7 |
| 2 | cover | 16 |
| 3 | material | 21 |
| 4 | silicon | 6 |
| 5 | water-shedding | 12 |
|   | ---- | ---- |

→ WITH CORRESPONDING EQUIVALENT
◄--► WITHOUT CORRESPONDING EQUIVALENT

FIG. 18

MATCHING WORD SENSE LIST  [MODIFY] [END]

- [✓] {cell,電池} [電極,長時間,・・・]   [ ] {cell,細胞} [核,ウィルス]
- [✓] {panel,回答者} [クイズ,会議]   [ ] {panel,パネル,はめ板}
- {energy,エネルギー}
- {silicon,シリコン,ケイ素}
  ・・・

FIG. 19

CLASSIFICATION KNOWLEDGE
CONTRADICTION WORD SENSE LIST  [MODIFY] [END]

- [✓] {panel,回答者} [クイズ,会議]   [ ] {panel,パネル,はめ板} [厚さ]
  ・・・

CROSS LINGUAL TEXT CLASSIFICATION APPARATUS AND METHOD

BACKGROUND OF THE INVENTION

1. Field of the Invention

The present invention relates to a text classification apparatus and method for classifying a text by learning a text classification knowledge from texts, which have been manually assigned respective categories, for use in the classification of texts, and more particularly, to a cross lingual text classification apparatus and method for classifying texts written in a plurality of languages.

2. Description of the Related Art

The proliferation of word processors and personal computers (PC) permits most of texts to be electronically created, resulting in an increased amount of electronic texts which can be handled on computers. An automatic text classification has been developed as one technology for accommodating such a situation. The automatic text classification uses a text classification knowledge learned from labeled texts (texts which have been manually assigned categories) to newly assign appropriate categories to unlabeled texts (texts which have not been assigned categories).

Conventionally, the text classification has been utilized for classifying texts in a single language such as Japanese, by way of example. However, with the current popularization of the Internet and advanced globalization, an increasing need exists for handling texts in a plurality of languages. To support such a purpose, JP-A-9-6799, for example, discloses a text classification apparatus and a text search apparatus for classifying texts independently of a particular language using a manually created concept dictionary. On the other hand, JP-A-2003-76710 discloses another approach in a cross lingual information retrieval system which translates a query using a bilingual dictionary. The idea disclosed in JP-A-2003-76710 can be applied to a text classification. Specifically, the basic idea of JP-A-2003-76710 can be applied to a text classification by translating texts into a certain single language, for example, English, followed by the classification of the texts.

The conventional approaches imply the following problems.

(1) System Based on Manually Created Concept Dictionary:

The system based on a manually created concept dictionary encounters extreme difficulties in creating a concept dictionary, resulting in a prohibitively high cost which makes the construction of a system infeasible. Particularly, when a system intends to cover wide fields, it is extremely difficult to manually create the concept dictionary.

(2) System Based on Translation Using Bilingual Dictionary:

The translation-based system fails to translate certain words if a bilingual dictionary is not sufficiently prepared, resulting in a degraded classification accuracy. Since a high cost will be entailed for increasing the coverage of the bilingual dictionary as is the case with the concept dictionary, this system is infeasible if the bilingual dictionary is assumed to provide a high coverage.

The bilingual dictionary also implies the problem of ambiguity, meaning that one entry word may have a plurality of equivalents. Generally, the translation-based system relies on a machine translation to select one from possible equivalents of a word or to translate the word into all possible equivalents, wherein the former is more susceptible to leakage, while the latter is more susceptible to noise.

SUMMARY OF THE INVENTION

It is a first object of the present invention to provide a classification system intended for classifying texts in a plurality of languages based on the concept or word sense. Specifically, unlike the prior art, the present invention provides a method for constructing the cross lingual text classification system, which can classify texts in a plurality of languages at an acceptable cost on the basis of a automatic conversion of a word in a certain language into a language-independent concept.

It is a second object of the present invention to provide a cross lingual text classification system which is capable of accomplishing more accurate classification results than the prior art even if bilingual dictionary is not sufficiently prepared.

It is a third object of the present invention to provide a cross lingual text classification system which can classify more accurately in respective languages when there are labeled texts in a plurality of languages, as compared with a previous classification system which is constructed by the prior art.

It is a fourth object of the present invention to provide a method of interactively modifying classification results and a classification knowledge using word sense.

The first object of the present invention can be achieved by a method of text classification. This method includes the steps of learning a knowledge for converting a word into a word sense from unlabeled texts in at least two languages, converting a set of words extracted from a labeled text in a first language into a set of word sense in each category basis using the knowledge for converting a word into a word sense, learning a classification knowledge comprised of word senses from the set of word senses of each category, converting a set of words extracted from a text in a second language to be classified into a set of word senses, and comparing the set of word senses extracted from the text in the second language with the classification knowledge comprised of word senses to determine a category for the text in the second language.

In addition to the foregoing, the second object of the present invention can be achieved by a classification method which extracts co-occurrence of words from a unlabeled text in the second language, acquires a word in the second language which forms part of the classification knowledge comprised of learned word senses, extracts a word closely related to the acquired word in the second language based on the word co-occurrence, uses the extracted word as a classification knowledge for the second language to compare with a set of words extracted from the text in the second language to be classified and to calculate a score, and determines a category for the text in the second language to be classified using both the classification knowledge comprised of word senses or the classification knowledge comprised of words in the second language.

In addition to the method for achieving the first object, the third object of the present invention can be achieved by a classification system which learns a word-based classification knowledge from a labeled text in the second language, compares the word-based classification knowledge with a set of words extracted from a text in the second language to be classified to calculate a score, and determines a category for the text in the second language to be classified based on a score determined by integrating the word-based score and the word sense-based score.

In addition to the method for achieving the first object, the fourth object of the present invention can be achieved by a method which includes the steps of displaying possible word senses for a word having a plurality of word senses to prompt a user to select one from the displayed word senses, calculating again the score based on a word sense selected by the user to again determine the category, comparing a classification knowledge of the finally determined category with a set of word senses extracted from the text under processing to detect a word having contradictory word senses, displaying the detected words to the user to prompt the user to select an appropriate word sense, and modifying the word sense-based classification knowledge in accordance with the selected word sense.

As appreciated from the foregoing, the present invention can provide a system for classifying texts in a plurality of languages such as Japanese and English at a feasible cost. Also, the text classification system according to the present invention can accurately text classify texts even if a bilingual dictionary is imperfect, as compared with the prior art. The present invention can further construct a highly accurate text classification system in each of a plurality of languages to be classified, as compared with a classification system which is constructed in accordance with the prior art. In addition, the use of word sense permits the user to interactively modify classification results and classification knowledge in a manner readily perceivable by a human.

Other objects, features and advantages of the invention will become apparent from the following description of the embodiments of the invention taken in conjunction with the accompanying drawings.

BRIEF DESCRIPTION OF THE DRAWINGS

FIG. 3 is a flow chart illustrating a processing procedure of the Japanese-English text classification support system;

FIG. 6 is a flow chart illustrating a processing procedure of the word sense-based classification knowledge learning process;

FIG. 7 shows an exemplary Japanese word table;

FIG. 8 shows exemplary word sense vectors;

FIG. 9 shows an exemplary word sense-based classification knowledge;

FIG. 10 is a flow chart illustrating a processing procedure of a high-accuracy English word-based classification knowledge learning process;

FIG. 11 shows an exemplary English word table;

FIG. 18 shows an exemplary screen which is displayed for an interactive classification of a text; and FIG. 19 shows an exemplary screen which is displayed for interactively modifying a classification knowledge.

DETAILED DESCRIPTION OF THE EMBODIMENTS

In the following, one embodiment of the present invention will be described with reference to the accompanying drawings.

Figure 1:
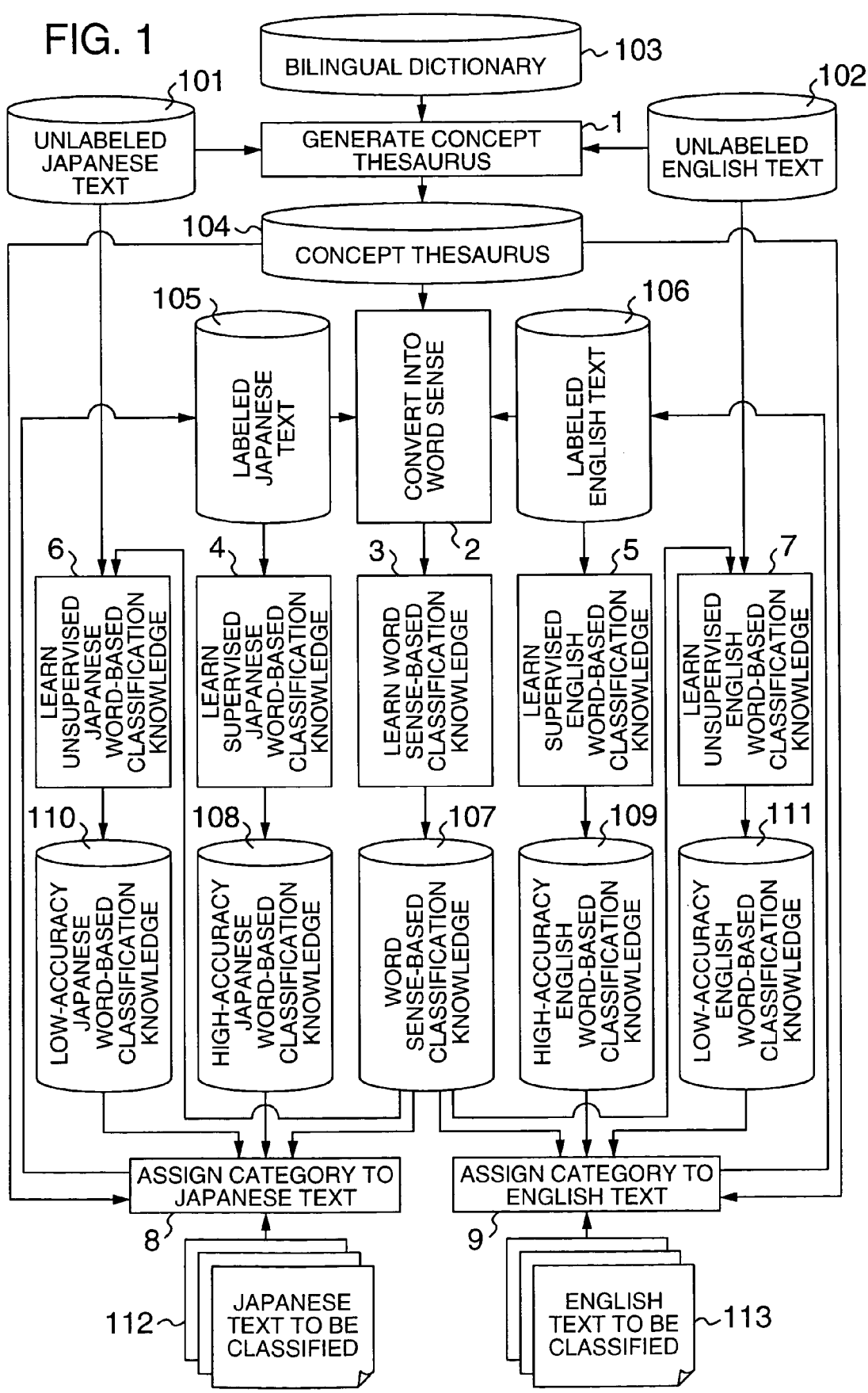
FIG. 1 is a block diagram illustrating a Japanese-English bilingual text classification support system according to one embodiment of the present invention.

FIG. 1 illustrates a block diagram of a bilingual text classification support system according to the present invention. The bilingual text classification support system according to the present invention comprises a group of programs which learn a classification knowledge for assigning a category to a text, and a group of programs which uses the learned classification knowledge to assign a category to a text. While a text classification support system which supports two languages, i.e., Japanese and English is given herein as an example for purposes of description, the languages processed by the system are not limited to these two languages. In addition, text classification, learning, and the like can be carried out in a similar approach as well when the system supports three or more languages.

The group of programs which learn the classification knowledge includes a concept thesaurus production program 1 for generating a concept thesaurus 104 from a Japanese text 101, an English text 102, and a bilingual dictionary 103; a word sense conversion program 2 for dividing a labeled Japanese text 105 and a labeled English text 106 into words, and also converting the words into contextually correct word senses; word sense-based classification knowledge learning program 3 for learning word sense-based classification knowledge 107 from the word senses; a Japanese word-based classification knowledge learning program 4 for learning a high-accuracy Japanese word-based classification knowledge 108 from the labeled Japanese text 105; an English classification knowledge learning program 5 for learning a high-accuracy English word-based classification knowledge 109 from the labeled English text 106; a unsupervised Japanese word-based classification knowledge learning program 6 for learning a low-accuracy Japanese word-based classification knowledge 110 from a word sense-based classification knowledge 107 and the Japanese text 101; and a unsupervised English word-based classification knowledge learning program 7 for learning a low-accuracy English word-based classification knowledge 111 from the word sense-based classification knowledge 107 and English text 102. Since the Japanese text 101 and English text 102 need not be assigned categories, they may be called the "unlabeled Japanese text" and "unlabeled English text," respectively.

The group of programs for assigning a category comprises a Japanese category assignment program 8 for assigning a category to a Japanese text 112 to be classified using the word sense-based classification knowledge 107, high-accuracy Japanese word-based classification knowledge 108, and low-accuracy Japanese word-based classification knowledge 109; and an English category assignment program 9 for assigning a category to an English text 113 using the word sense-based classification knowledge 107, high-accuracy English word-based classification knowledge 109, and low-accuracy English word-based classification knowledge 111.

Figure 2:
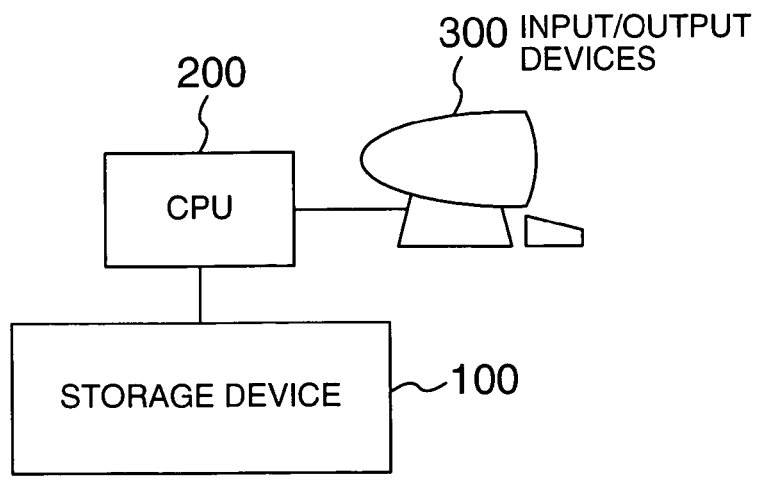
FIG. 2 is a schematic diagram illustrating the configuration of components which make up the Japanese-English bilingual text classification support system.

FIG. 2 illustrates the configuration of devices provided for embodying the present invention. The devices for embodying the present invention comprises a storage device 100 for storing the groups of programs such as the concept thesaurus generation program 1 and the like, and data files such as the unlabeled Japanese text 101; a CPU 200 for executing a variety of processing; and input/output devices 300 which may include a keyboard or a mouse for accepting input from the user, a display for displaying processing results to the user, and the like. While FIG. 2 illustrates the configuration of a stand-alone system given as an example, the present invention is not limited to the illustrated configuration. For example, a device for learning the classification knowledge may be provided separately from a device for assigning a category to a text. In addition, a different device for learning a classification knowledge may be provided for every type of classification knowledge or on a category-by-category basis. Further, the device for assigning a category to a text may be in a client-server configuration which permits a plurality of users to simultaneously use the device.

The following description will be made on processing procedures performed by the Japanese-English cross lingual text classification support system in this embodiment. First, a processing procedure for learning a classification knowledge will be described with reference to a processing flow of FIG. 3. The following description will be made on the assumption that a system for classifying English texts is constructed when there are unlabeled Japanese and English texts, and a labeled Japanese text. However, the present system is not limited to this scenario, but is symmetric to both Japanese and English, as can be understood as well from the configuration in FIG. 1.

The concept thesaurus is generated from the unlabeled Japanese text and unlabeled English text using the bilingual dictionary (step 11). Since the processing at step 11 can be implemented by applying the technique disclosed in JP-A-2001-331484 (a recording medium which has recorded thereon a parallel thesaurus production program, a recording medium which has recorded thereon parallel thesaurus, and a recording medium which has recorded thereon a parallel thesaurus navigation program), detailed description thereon is omitted.

Figure 4:
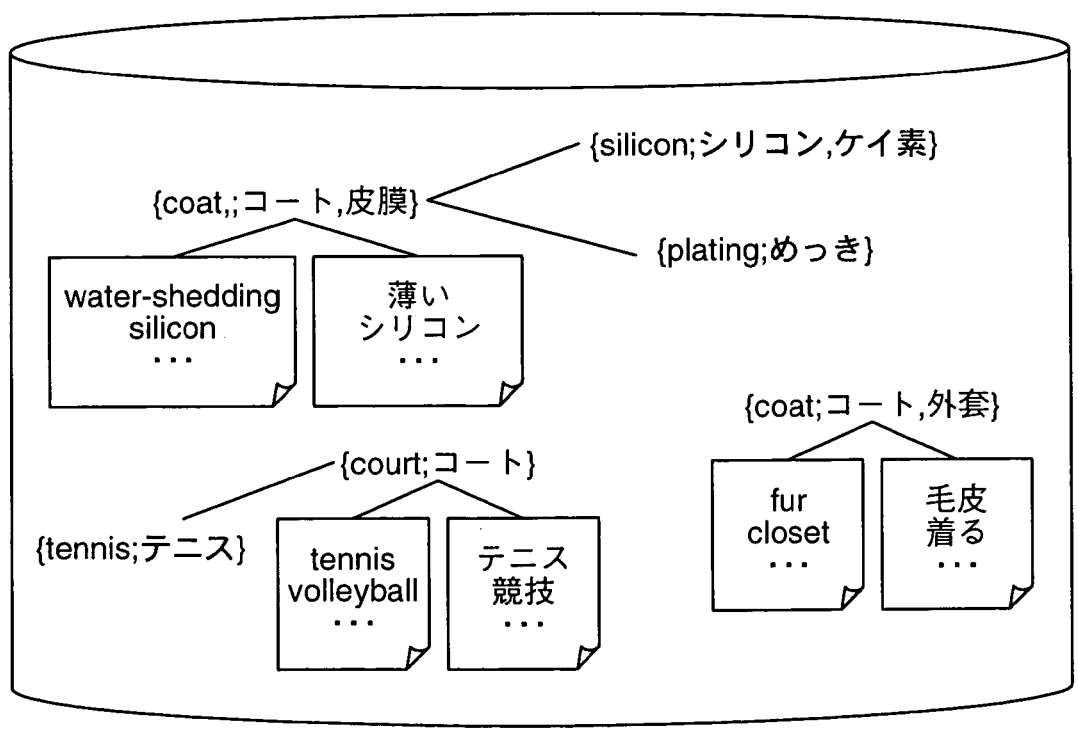
FIG. 4 is a block diagram conceptually illustrating a concept thesaurus.

FIG. 4 conceptually illustrates the concept thesaurus. The concept thesaurus comprises of a set of word senses and links between word senses. A word sense is represented as a set of Japanese and English words. A Japanese word or an English word which constitutes the word sense is called the "Japanese word sense constituent word" or "English word sense constituent word," respectively, and is also called the "word sense constituent word" as a generic term independent of the language. A word sense has sets of Japanese and English words, respectively, as a condition for determining the word sense of a Japanese or English word. A word which functions as a condition for determining the word sense is called the "key word." Consider a homonym expressed by phonograms in Japanese. For example, in the example illustrated in FIG. 4, a word "コート"(pronunciation: kㄱ:t ) has the three words senses, <court, コート>, <coat, コート, 皮膜>and <coat, コート, 外套>.The word sense of the word "コート"is <court, コート>when it is used together with such a word as "テニス"(tennis). Related word senses are coupled by a link. However, in this embodiment, information on the link is not utilized in particular. Unlabeled texts can be readily collected because they are currently created in volume through the Internet and the like or in enterprises and the like.

The word sense-based classification knowledge is learned from the labeled Japanese text, labeled English text, and concept thesaurus (step 12). The word sense-based classification knowledge describes a knowledge required for text classification based on the word senses in the concept thesaurus generated at step 11. Thus, the word sense-based classification knowledge does not depend on a language of a text which is to be classified. The word sense-based classification knowledge does not either depend on a language of a labeled text which functions as training data for learning the word sense-based classification knowledge. In other words, the system can learn the word sense-based classification knowledge, for example, even if there exists only a labeled Japanese text without a labeled English text. A relatively high cost is entailed for preparing labeled texts which function as training data for learning the classification knowledge. Further, for a user whose mother language is Japanese, for example, a task of determining the category of an English text is a heavy burden. The present invention can help reduce the burden on the user because the word sense-based classification knowledge can be learned from labeled texts in one language. Step 12 will be described later in greater detail.

The high-accuracy English word-based classification knowledge is learned from the labeled English text (step 13). The high-accuracy English word-based classification knowledge describes a knowledge required for the text classification on a word-by-word basis. Therefore, the high-accuracy English word-based classification knowledge is used only in the classification of English texts. Also, the high-accuracy English word-based classification knowledge is highly accurate because it is supervisedly learned from training data which is given a category by human (manually prepared). Step 13 will be described later in greater detail.

The high-accuracy Japanese word-based classification knowledge is learned from the labeled Japanese text (step 14). Since this step can be processed in a manner similar to step 13 except that the learned knowledge is in Japanese, description on step 14 is omitted on the assumption that detailed description on step 13 can be applied thereto.

The low-accuracy English word-based classification knowledge is learned from the unlabeled English text (step 15). The low-accuracy English word-based classification knowledge describes a knowledge required for the word classification on a word-by-word basis. Therefore, the low-accuracy English word-based classification knowledge is used only in the classification of English texts. Also, the low-accuracy English word-based classification knowledge is inaccurate because it is unsupervisedly learned from data which is not assigned a category. Step 15 will be described later in greater detail.

The low-accuracy Japanese word-based classification knowledge is learned from the labeled Japanese text (step 16). Since this step can be processed in a manner similar to step 15 except that the learned knowledge is in Japanese, description on step 16 is omitted on the assumption that detailed description on step 15 can be applied thereto.

Through the foregoing process, the system learns three types of classification knowledges: the word sense-based classification knowledge, Japanese word-based classification knowledge, and English word-based classification knowledge. By using these classification knowledges in combination as appropriate, the resulting bilingual classification support system can accomplish a higher accuracy.

Figure 5:
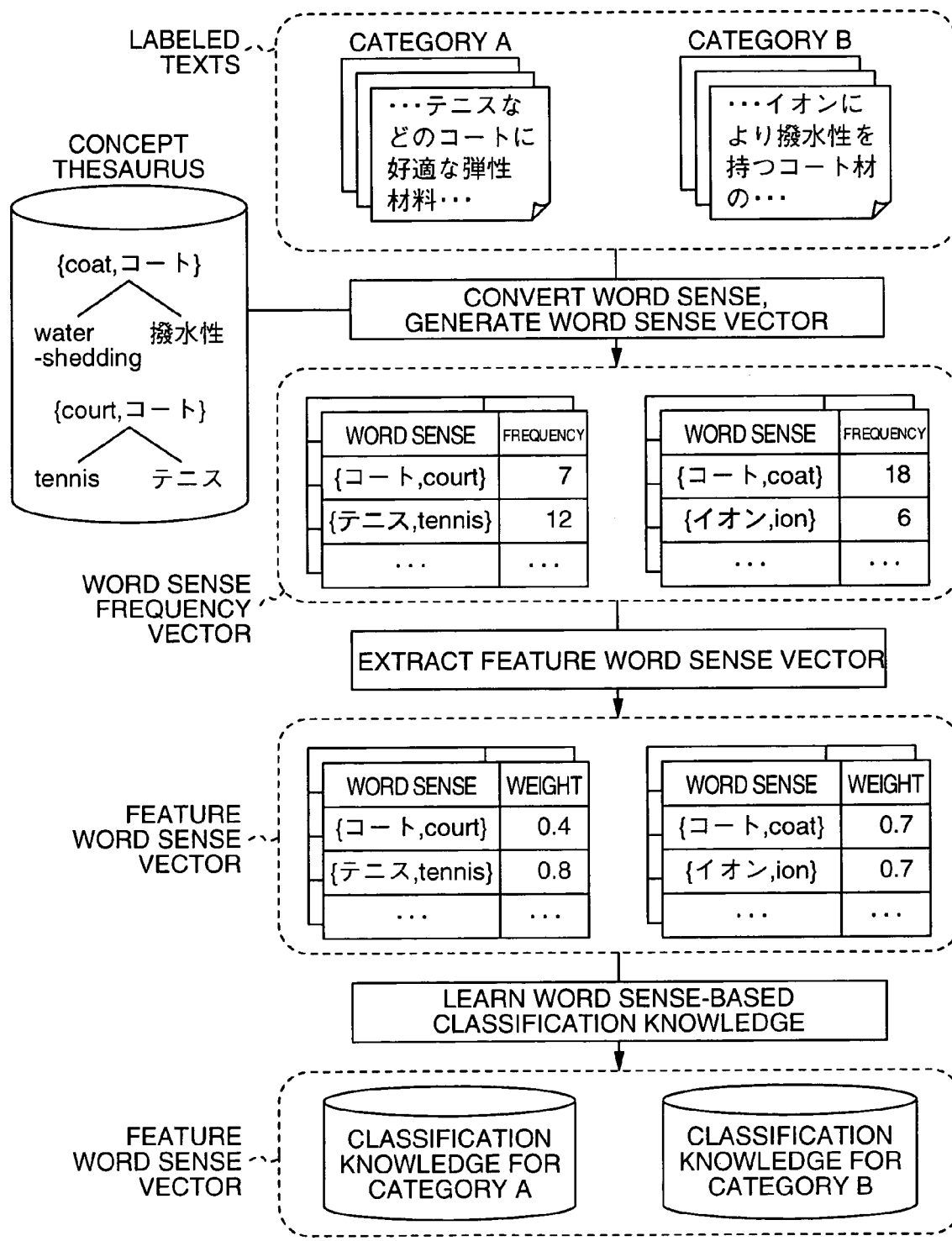
FIG. 5 is a block diagram conceptually illustrating a word sense-based classification knowledge learning process.

The following description will be made on the processing at step 12 for learning the word sense-based classification knowledge in detail with reference to FIGS. 5 and 6. FIG. 5 is a block diagram conceptually illustrating the process for learning the word sense-based classification knowledge. FIG. 6 is a flow chart illustrating a processing procedure for learning the word sense-based classification knowledge.

The labeled Japanese text or English text is retrieved and divided into words (step 121). A morphological analysis method for dividing a sentence or a text into words is disclosed, for example, in JP-A-2000-259629 (morphological analysis method and apparatus). Since this disclosed method can be applied to this step, description thereon is omitted. FIG. 7 shows an exemplary word table for storing the result of the word division. The word table stores those words which appear in a text, as divided at step 121, in the order in which they appear in the text.

The words resulting from the division are converted into respective word senses (step 122). The conversion into word sense is performed in the following manner. A word to be converted into a word sense is selected to be a word of interest, and words near the word of interest, for example, within N words centered at the word of interest, are selected to be contextual words. It should be noted that the selection of nearby words as contextual words is limited to content words, the word class of which is noun, verb, adjective, and the like. Intended word classes should have been determined beforehand. In the example shown in FIG. 7, assuming, for example, that "コート"(pronunciation: k⊃:t) is selected to be a word of interest, and two words in front of and behind the word of interest are selected to be contextual words, "シリコン"(silicon), "被履する"(cover), 材料(material), and "撥水性"(water shedding) are selected to be contextual words. The concept thesaurus is searched for the word of interest to retrieve candidate word senses and a set of key words associated with the respective candidate word senses. The set of key words is compared with the contextual words to select the word sense which is deemed to be most appropriate. In the concept thesaurus illustrated in the example of FIG. 4, "シリコン"and "撥水性"are retrieved as key words for word senses which include "コート"In this way, <coat, コート, 被膜> is selected as the word sense of the "コート"in this context. The foregoing processing is executed for the words of interest one by one to convert all words into their appropriate word senses.

A sequence of word senses resulting from the conversion of the morphological analysis result is totalized to generate word sense vectors (step 123). FIG. 8 shows exemplary word sense vectors. Each word sense vector consists of a word sense and the frequency at which the word sense appears in the text.

It is checked whether or not all labeled texts have been processed (step 124). The procedure returns to step 121 if there are some texts left unprocessed, and proceeds to step 125 if all texts have been processed.

The word sense-based classification knowledge is learned from the word sense vectors of the text (step 125). The learning of the classification knowledge may be implemented by using a method described, for example, in Lewis, D. D. and Ringuette, M., A comparison of two learning algorithms for text categorization, Third Annual Symposium on Document Analysis and Information Retrieval, 1994, pp. 81-93 (hereinafter <Lewis>), so that detailed description thereon is omitted. In the following, a Rocchio-based method of learning a classification knowledge will be described in brief by way of example.

First, the resulting word sense vectors are statistically processed to extract word sense feature vectors. The Rocchio method determines the feature vector of each text as represented by the following Equation 1:

$$\vec{d} = (d_1, d_2, \cdots)$$

$$d_j = \frac{f_j \times \log(m/m_j)}{\sqrt{\sum_k (f_k \times \log(m/m_k))^2}}$$

Equation 1 where $\vec{d}$: Feature Vector of Text $\underline{d}$;
 $f_j$: Appearance Frequency of Word sense $c_j$ in Text $\underline{d}$ (generally, the appearance frequency of word $w_j$);
 m: Number of Texts for Learning;
 $m_j$: Number of Texts in which Word sense $c_j$ Appears in Texts for Learning.

A weight calculated by the method represented by Equation 1 is called a "tf–idf value" (Term Frequency–Inverted Document Frequency) because it is generally calculated for a word.

The word sense-based classification knowledge is extracted from the calculated word sense feature vectors and information on the categories given to the original labeled texts. A feature vector of a category is defined as represented by the following Equation 2 as an average of the word sense feature vectors of texts included in each category:

$$\vec{C}_i = \frac{\sum_{d \in D_i} \vec{d}}{|D_i|}$$

Equation 2 wherein $\vec{C}_i$: Feature Vector of Category $C_i$; and
 $D_i$: Set of Texts Included in Category $C_i$.

FIG. 9 shows an exemplary word sense-based classification knowledge.

The word sense-based classification knowledge can be learned by the foregoing method. It should be understood that while the Rocchio method has been described above by way of example, the present invention is not necessarily limited to this method.

The following description will be focused on the processing at step 13 for learning the high-accuracy English word-based classification knowledge in greater detail with reference to FIG. 10. The learning of the high-accuracy English word-based classification knowledge can be carried out through substantially similar processing to the learning of the word sense-based classification knowledge, the concept of which has been illustrated in FIG. 5. They differ only in that the learning of the word sense-based classification knowledge involves the conversion of words into respective word senses, so that the word may be substituted for the word sense for understanding in the rest of the procedure.

A labeled English text is extracted and divided into words (step 131). Since the division can be carried out in a manner similar to the processing at step 121, detailed description thereon is omitted. However, in the assumption of this embodiment, the processing at step 121 is mainly directed to a Japanese text, whereas the processing at step 131 is directed to an English text, so that the difference between the two steps will be described below in brief. A Japanese text is comprised of words which are not clearly delimited, whereas an English text is comprised of words which are clearly delimited using a space character between adjacent words. With a space existing between adjacent words, the division of an English text into words is facilitated as compared with a Japanese text. This eliminates the need for using the technique as disclosed in JP-A-2000-259629 referred to in the description on step 121, and in many cases permits the processing at step 131 to merely involve dividing an English text into words at respective space characters in a more simple manner, and subsequently consulting a dictionary for converting the inflectional form into a root form. FIG. 11 shows an exemplary English word table which is the result of the division.

Figures 12, 13:
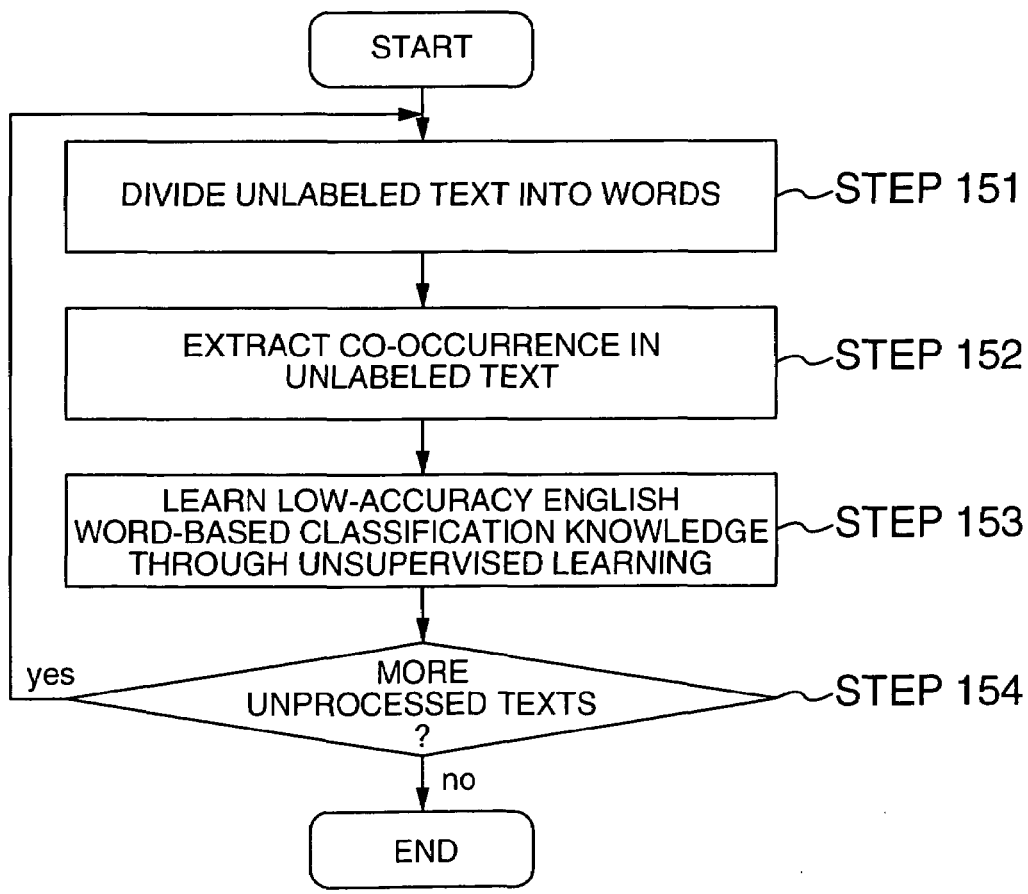
FIG. 12 shows exemplary English word vectors.
FIG. 13 is a flow chart illustrating a processing procedure of a low-accuracy English word-based classification knowledge learning process.

A sequence of words resulting from the conversion of the morphological analysis result is totalized to generate English word vectors (step 132). FIG. 12 shows exemplary English word vectors. An English word vector has a form which has an English word substituted for the word sense in the word sense vector in FIG. 8.

It is checked whether or not all labeled texts have been processed (step 133). The procedure returns to step 131 if there are some texts left unprocessed, and proceeds to step 134 if all texts have been processed.

The English word-based classification knowledge is learned from the English word vectors of the texts (step 134). Since this can be performed in a manner similar to the processing at step 125, description thereon is omitted.

The following description will be focused on the processing at step 15 for learning the low-accuracy English word-based classification knowledge in greater detail with reference to FIG. 13.

A unlabeled English text is extracted, and divided into words (step 151). Step 151 is similar to step 131, and provides an English word table as shown in FIG. 11 as a result of the division.

A word co-occurrence is extracted from an morphological analysis result (step 152). The word co-occurrence refers to a set of words which appear "simultaneously" in a text. While a word co-occurrence may be extracted in a variety of methods, a method using a window on a word sequence will be described here in brief. This method is similar to the selection of contextual words for the conversion into word sense, as described in connection with step 122. The English word table shown in FIG. 11 is given as an example for the following description. A certain word is noted on the word table, and is designated as a word of interest. Words near the word of interest, for example, N words centered at the word of interest, are selected to be co-occurrence words. It should be noted that the selection of nearby words as co-occurrence words is limited to content words, the word class of which is noun, verb, adjective, and the like. Intended word classes should have been determined beforehand. In the example shown in FIG. 11, assuming, for example, that "coat" is selected to be a word of interest, and two words in front of and behind the word of interest are selected to be co-occurrency, "cover", "silicon", "water shedding", and "material" are selected to be co-occurrence words. In this event, sets of the word of interest and the co-occurrence words are outputted as word co-occurrence. In this example, <coat, cover>, <coat, silicon>, <coat, water-shedding>, and <coat, material> are extracted as word co-occurrence.

The low-accuracy English word-based classification knowledge is learned through unsupervised learning (step 153). This step will be described below in detail.

Figure 14:
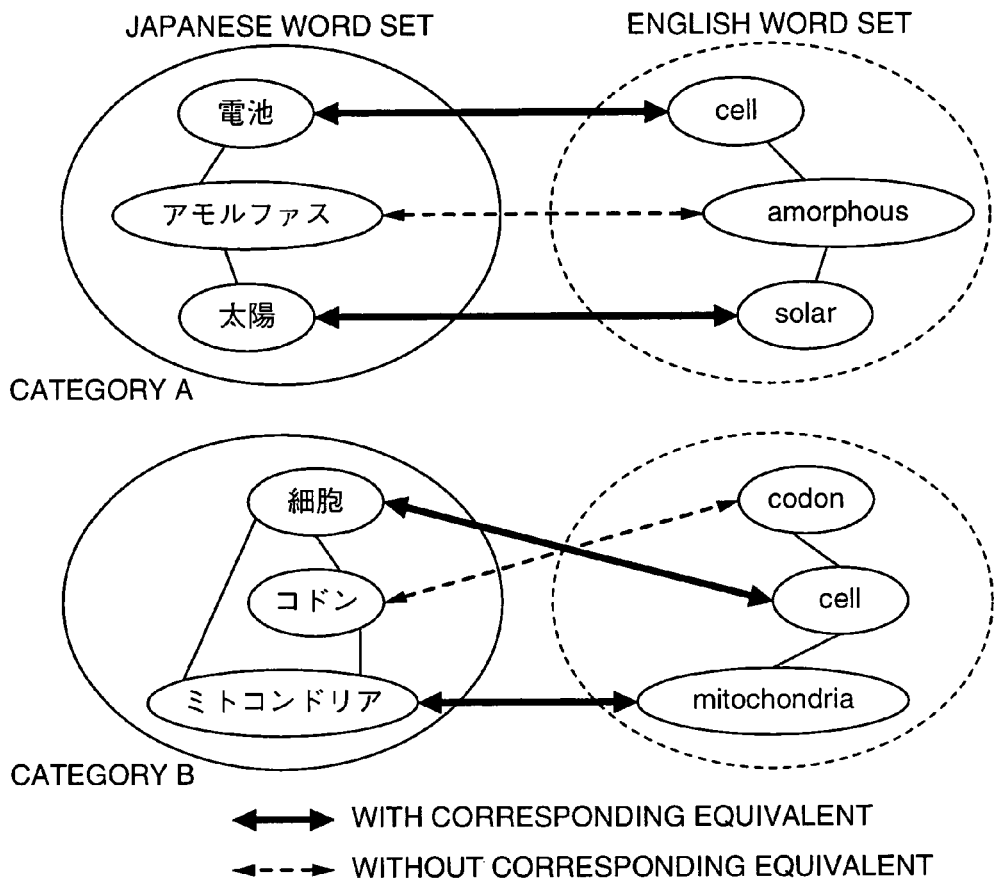
FIG. 14 is a schematic diagram conceptually illustrating the low-accuracy English word-based classification knowledge learning process.
Figure 15:
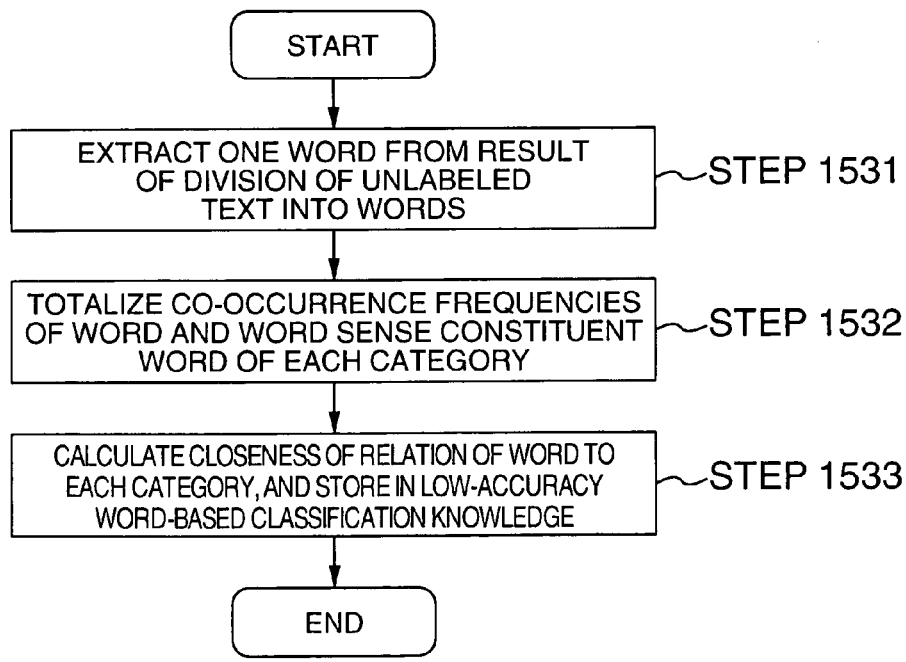
FIG. 15 is a flow chart illustrating a processing procedure of the low-accuracy English word-based classification knowledge learning process through unsupervised learning.

A basic concept will be first discussed with reference to a conceptual diagram illustrated in FIG. 14. Assume that the word sense-based classification knowledge learning has resulted in extraction of <cell, 電池>and <solar, 太陽>as word senses which characterize a category A, and extraction of <cell, 細胞>and <mitochondria, ミトコドリア>as word senses which characterize a category B. In this event, it is not possible to extract a set of Japanese and English words which are not included in a bilingual dictionary used in the production of the concept thesaurus. It is contemplated however that in spite of a close relation with a word sense extracted as the word sense-based classification knowledge, there can often be word senses, the equivalents of which are not included in the dictionary. This is because words included in a bilingual dictionary present relatively high generality, whereas technical terms in a certain field are important for identifying the category. In the example shown in FIG. 14, though the word senses <amorphous, アモルファス> and <codon, コドン> cannot be extracted because they are not included in the bilingual dictionary, they are word senses which well characterize the respective categories. The present invention provides a method of supplementarily extracting such word senses through the unsupervised learning based on information on a relation between words. Specifically, information related on the closeness of a relation between respective words has been extracted in each of Japanese and English, and words which have a close relation with words have word senses extracted as the word sense-based classification knowledge in each category are added as terms which characterize each category, thereby preventing leaked feature words of the category due to imperfections of the bilingual dictionary. The technique for compiling words into groups using the relation between words is called "word clustering" which is described, for example, in "Language and Calculation 4—Probablistic Language Model," edited by Junichi Tsujii, Tokyo University Publication, 1999. However, the word clustering alone would encounter difficulties in providing correct clustering results due to semantic ambiguities of words. Particularly, a category system previously defined by a human cannot be expected to match with the result of clustering executed by a computer. To solve this problem, the present invention supplementarily extracts words which characterize respective categories by considering word sense constituent words, which characterize the respective categories, previously retrieved during the acquisition of the word sense-based classification knowledge as core (center) of cluster. While a variety of specific algorithms can be applied to the clustering, the following description will be made on a simple method which utilizes the word co-occurrence relation in detail with reference to a processing flow illustrated in FIG. 15.

One word is extracted from the word list extracted from the unlabeled text at step 151 (step 1531).

The closeness of relation is calculated between the extracted word and each of word sense constituent words in the word-based classification knowledge of each category (step 1532). It is determined whether or not a set of the extracted word and each word sense constituent word of each category constitutes a co-occurrence through a comparison with the co-occurrence data extracted at step 152. When the set constitutes a co-occurrence, a total of its co-occurrence frequencies is aggregated for each category.

The proportion of the total of the resulting collocation frequencies of the respective categories to the total of the collocation frequencies of all the categories is defined to be the closeness of the relation of the extracted word to each category, and stored in the low-accuracy word-based classification knowledge of each category (step 1533). In this event, however, if the frequency itself is low to cause a low statistic reliability, the proportion may be calculated after the reliability is evaluated by a statistic test or the like. Alternatively, for more simplification, a collocation having a frequency lower than a predefined threshold may be removed.

While the foregoing description has been made on a simple method using the collocation, the present invention is not limited to this method. Any approach can be applied to the clustering as long as the word sense constituent words are handled as if they are species for clustering. For example, a k-means method may be used to implement the clustering, for example, as described in Duda, R. O., Hart, P. E., Stork, D. G., Pattern Classification, Canada, Wiley-Interscience, 2002, pp. 526-528.

Figure 16:
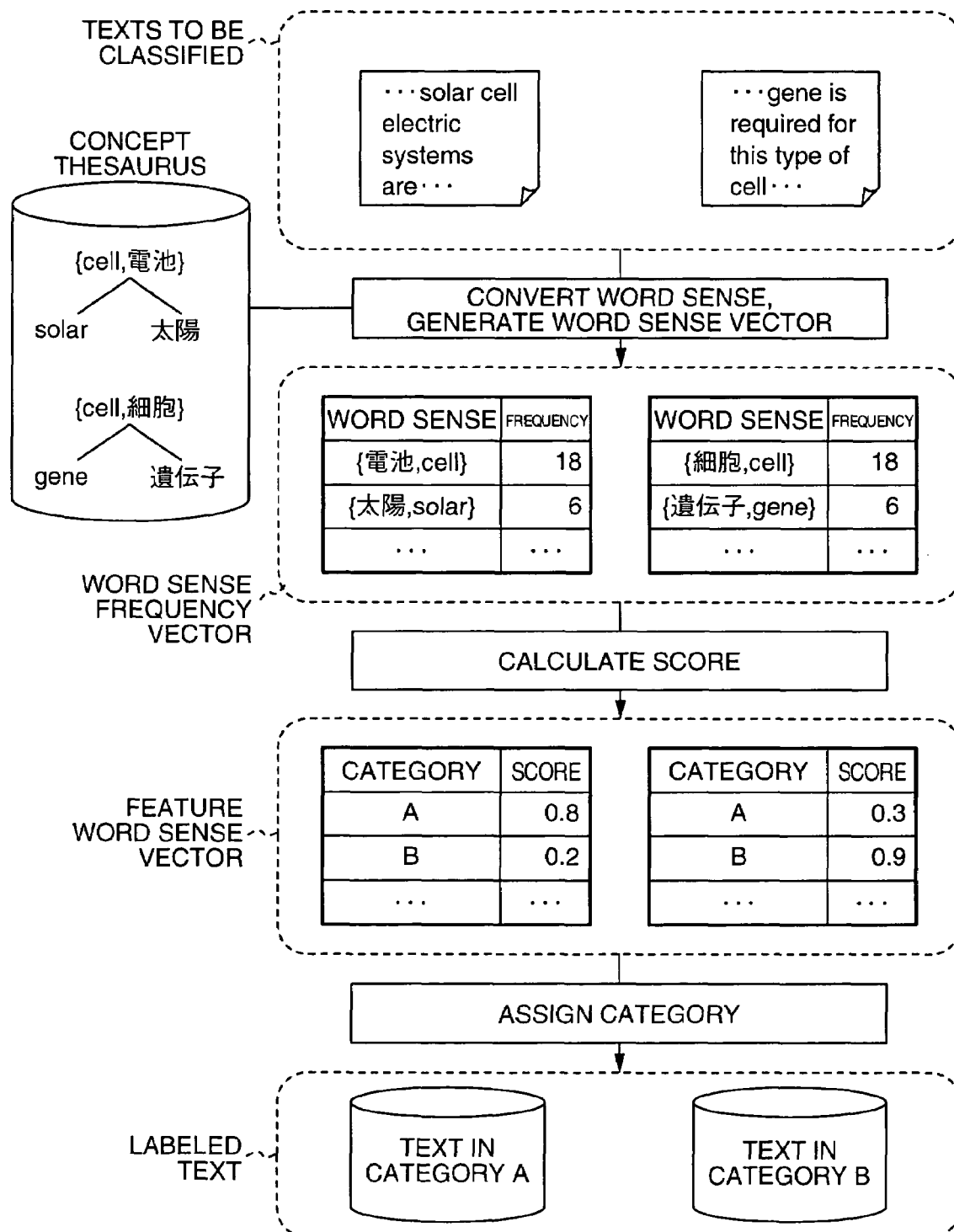
FIG. 16 is a block diagram conceptually illustrating a classification process using the word sense-based classification knowledge.
Figure 17:
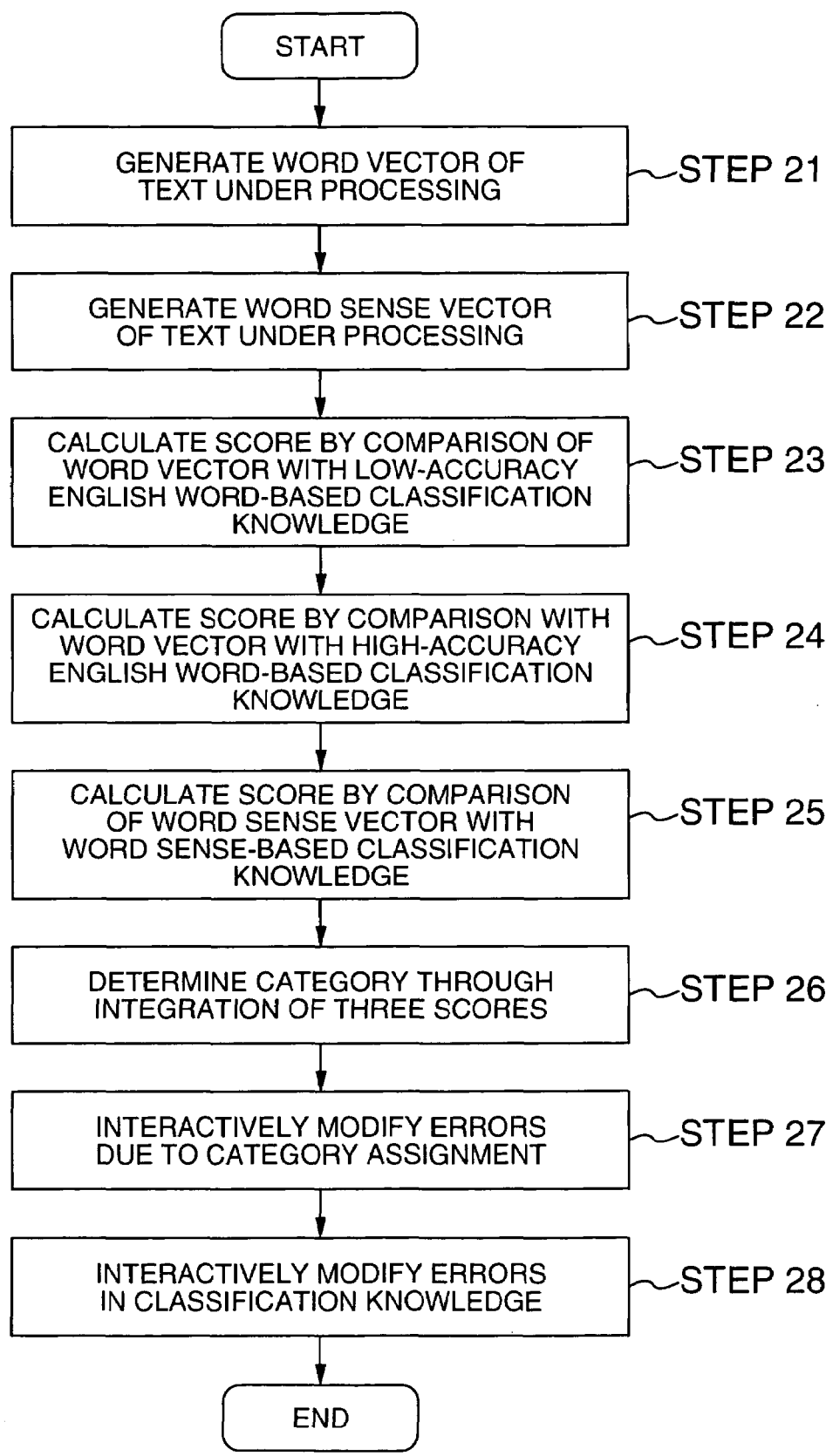
FIG. 17 is a flow chart illustrating a processing procedure of classification.

Next, the category assignment process will be described with reference to FIGS. 16 and 17. FIG. 16 is a block diagram conceptually illustrating a category assignment process using the word sense-based classification knowledge. FIG. 17 is a flow chart illustrating an overall processing procedure of the category assignment. While this embodiment is described in connection with an example in which an English text is entered, a similar category assignment process can be executed as well when a Japanese text is entered.

A text under processing is divided into words, and a sequence of the resulting words is totalized to generate word vectors (step 21). Since the processing at step 21 can be executed in a manner similar to step 121 and step 132, description thereon is omitted.

The words resulting from the division are converted into respective word senses using the concept thesaurus, and a sequence of the resulting word senses are totalized to generate word sense vectors (step 22). Since the processing at step 22 can be executed in a manner similar to step 122 and step 123, description thereon is omitted.

The word vectors are compared with the low-accuracy English word-based classification knowledge to calculate a score for each category (step 23). Since the processing at step 23 can be executed, for example, using the method described in <Lewis>, description thereon is omitted. Here, a Rocchio-based category assignment method will be described in brief by way of example.

The Rocchio method converts a word vector to a word feature vector in a manner similar to that described in connection with step 125, and compares the word feature vector with the word sense-based classification knowledge to calculate a score. Specifically, the score between a text and a category is defined as represented by the following Equation 3:

$$sim_R(C_i, d) = \frac{\vec{C_i} \cdot \vec{d}}{|\vec{C_i}|} \qquad \text{Equation 3}$$

where $sim_R$: Score;

$\vec{C_i}$: Feature Vector of Category $C_i$; and $\vec{d}$: Set of Texts Included in Category $C_i$.

The word vector is compared with the high-accuracy English word-based classification knowledge to calculate a score for each category (step 24).

The word sense vector is compared with the word sense-based classification knowledge to calculate a score for each category (step 25). Since the processing at step 25 can be executed in a manner similar to step 23 or 24 by replacing the word with the word sense, description thereon is omitted.

The three types of scores are integrated to calculate a total score to determine a category to be given based on the total score (step 26). Alternatively, two of the three types of scores may be integrated to determine a category. In the example described herein, labeled English texts are used as teacher data, but the category assignment is not limited to such a method.

The total score ts is represented by the following equation:

$$ts = a*ws1 + b*ws2 + (1-a-b)*ms$$

where ws1 is a score based on the low-accuracy English word-based classification knowledge; ws2 is a score based on the high-accuracy English word-based classification knowledge; ms is a score based on the word sense-based classification knowledge; and a, b are parameters which satisfy $0 \leq a \leq 1, 0 \leq b \leq 1, 0 \leq 1-a-b \leq 1$, respectively. The parameters may be previously defined, for example, in the following method. The processing at step 21 to 27 is executed on a labeled English text to find ws1, ws2, ms. Next, a, b are changed, for example, from 0 to 1 by 0.05 to preliminarily calculate the score ts which is then relied on to assign a category which is compared with the previously assigned category to evaluate whether or not this is a correct answer. This sequence of processing may be executed on a number of labeled English texts (i.e., texts known to be assigned correct categories) sufficient to evaluate the reliability of the category assignment to find a correct answer ratio. Finally, a, b which exhibit the highest correct answer ratio are used as parameters.

While the present invention utilizes three types of classification knowledge learning methods, i.e., the supervised word-based classification knowledge learning, word sense-based classification knowledge learning, and unsupervised word-based classification knowledge learning, it seems that the supervised word classification learning provides the ability to learn a classification knowledge with the highest classification accuracy, while the unsupervised word-based classification knowledge learning results in the lowest classification accuracy. Also, the amount of data available for each learning method affects the accuracy of the classification based on the learned classification knowledge. Specifically, as the amount of data is larger, the classification accuracy is more improved. An object of the present invention is to make the most of data available at an arbitrary time to provide highly accurate classification results, and this object can be achieved by determining the scores in the foregoing manner. For example, the parameters should not be fixed after they are once determined, but are preferably changed as appropriate in response to variations in each data amount. For example, in a scenario assumed in this embodiment, there is not any labeled English texts, or there is a very few amount of labeled English texts, if any, available as supervised data in an initial state. Therefore, a text is labeled by use of the classification knowledge which has been learned through the word sense-based classification knowledge learning or unsupervised word-based classification knowledge learning. As the system is operated over time, categories assigned by the system are manually checked to increase the amount of labeled texts. After the labeled texts have increased in amount to some degree, the classification accuracy is improved by giving importance to the classification knowledge learned through the supervised word-based classification knowledge learning, i.e., by an increase in the value b resulting from the learning of the parameters. In this way, the system can be optimized to data available at an arbitrary time. The foregoing method alone cannot determine the parameters if any labeled English text does not exist, in which case, however, the parameters can even be determined by the following alternative. The alternative method utilizes labeled Japanese texts. Parameters are determined for a labeled Japanese text in a manner similar to the processing at step 26. In this event, the parameter b takes the value of zero, and the parameter a, which represents the importance of the result of the unsupervised word-based classification knowledge learning, should be determined. The value of the parameter a is determined for the score based on the low-accuracy Japanese word-based classification knowledge and the score based on word sense-based classification knowledge, and this value is regarded to represent the importance of the low-accuracy English word-based classification knowledge. The total score is calculated using this result.

Errors in the category assignment is modified in an interactive manner (step 27). The processing at step 27 will be described below in detail.

In the word-based text classification according to the prior art, an error in the category assignment is regarded as an error in an estimation of a conditional probability of a category given a certain word appearing in a text. However, it is almost impossible for a human to determine the correctness of a probability estimate. On the other hand, the present invention introduces the word sense of word, so that an overall error is comprised of accumulated errors generated in the process of converting a word into a word sense and in the process of determining a category based on the word sense. Here, if the word sense is correctly selected, a small error is generated in the process of determining a category. On the other hand, an error in the process of converting a word into a word sense can be presented in a form which permits the human to relatively readily determine the error. Thus, the introduction of the word sense enables the resulting text classification system to interactively assign a category.

Also, in a bilingual text classification system, the user of the system is thought to have learnt one of the two languages as his mother tongue. In this embodiment, it is assumed that the user whose mother tongue is Japanese classifies English texts. In this scenario, it is difficult for the user to understand texts in English, and determines whether or not an assigned category is correct in accordance with the contents of the texts. In the present invention, the text classification system can assist the user in determining whether or not an appropriate category is assigned by displaying a word sense used to assign a category in a language which is the mother tongue of the user (Japanese in this embodiment).

FIG. 18 shows an exemplary screen which is displayed for interactively modifying an error in the assignment of a category. Specifically, FIG. 18 shows a list of word senses used in assigning a category, and word senses which can lead to different solutions from these word senses. When a certain word sense has a word sense which can lead to a different solution, the certain word sense is displayed side by side with the word sense which is the different solution. When no different solution exists, the proper word sense alone is displayed. When different solutions exist, a check box is displayed for each different solution, and a check is given to a preferred solution. In the example shown in FIG. 18, since a word "cell" exists in a text to be classified, two word senses {cell, 電池(battery)} and {cell, 細胞(cytoplasmic)} can be derived as different solutions. Therefore, these two word senses are displayed side by side, and a check is given to <cell, 電池>which is the preferred solution. Also, for a word "energy", a word sense <energy, エネルギ->exists. However, since "energy" does not present ambiguity in word sense, <energy, エネルギ->alone is displayed. On the other hand, for an ambiguous word "panel", a false word sense <panel, 回答者(answerer)> is selected. If the user references such a display, the user can determine that <panel, パネル(panel), はめ板(siding board)> is more appropriate than the selected word sense <panel, 回答者>for a context represented by the word sense <cell, 電池><energy, エネルギ->,and <silicon, シリコン, ケイ素>. Consequently, the user again gives a check in a check box associated with <panel, パネル(panel), はめ板(siding board)>. This causes a modification to the contents of the word sense vectors, and recalculation of the score for each category. The recalculation may be explicitly made by the user. As the user selects a correct word sense in the foregoing manner, the classification accuracy can be improved through simple manipulations.

The classification knowledge is modified in an interactive manner (step 28). The processing at step 28 will be described below in detail.

Assume that a category has been determined as finally given to a text under processing, including the processing at step 28. In this event, the classification knowledge of the assigned category is compared with the word sense vector of the text under processing to extract contradictory word senses. Contradictory word senses refer to a plurality of word senses which can be associated with the same word. FIG. 19 shows an example. The example of FIG. 19 shows that a text under processing includes a word sense <panel, パネル はめ板>and the classification knowledge includes a word sense <panel, "シリコン"The two word senses are said to be contradictory because they are two different word senses of "panel" and the same word sense is highly likely to be used in texts which belong to the same category. In such a case, contradictory word senses within the classification knowledge are displayed to ask the user for confirmation, as shown in FIG. 19. If the user inputs a request for a modification, the word senses in the classification knowledge are changed. The foregoing process permits the user to interactively modify the classification knowledge.

A category can be assigned to an entered English text through the foregoing processing. While the prior art only relies on a score resulting from a comparison of a word vector with the English word-based classification knowledge at step 23 to determine a category, the system in the foregoing embodiment can determine a score additionally in consideration of a score resulting from a comparison with the word sense-based classification knowledge learned from a Japanese text, thus making it possible to achieve a higher classification accuracy, as compared with a classification system which relies on texts only in either Japanese or English.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A text classification, comprising:
a text input device for receiving an entered text;
a storage device for storing a concept thesaurus file for use in classifying an entered text to be classified, a cross lingual word sense-based knowledge file corresponding to a plurality of languages including a first and a second language, and a word-based classification knowledge file;
a processing unit for executing a classification of the entered text to be classified to assign a category to the entered text; and
an output device for outputting the classification result, wherein:
said text input device receives first entered text to be classified in the first language,
said processing unit is configured to:
extract a word from said first entered text to be classified;
convert the extracted a word into a word sense using said concept thesaurus file;
compare the word sense resulting from the conversion with information on each category included in said cross lingual word sense-based classification knowledge file to calculate a first score for each category;

compare the extracted word with word classification information included in said word-based classification knowledge file to calculate a second score for each category; and integrate said first and second scores for each category to determine a category for the first text to be classified in the first language for assigning a category to the first entered text, and said word-based classification knowledge file is generated by learning a word-based classification knowledge using words included in a labeled text in the first language, wherein: said text to be classified which has been assigned the category by said text classification apparatus is used for learning the word-based classification knowledge as a labeled text in the first language used in the generation of said word-based classification knowledge file.

2. A text classification apparatus according to claim 1, wherein: said cross lingual word sense-based classification knowledge file is generated by extracting a word included in a labeled text in the second language, converting the extracted word into a word sense using said concept thesaurus file, and learning the word sense-based classification knowledge using said word sense and category information on the labeled text in the second language.

3. A text classification apparatus according to claim 1, further comprising a display device, and a user input device for accepting an entry from a user, wherein: said display device displays a word sense used in the assignment of a category, and displays together word sense candidates other than the word sense used in the assignment of a category when a plurality of word sense candidates exist for a single word extracted from the text to be classified, and said text classification apparatus receives information entered for selecting one of the plurality of word sense candidates through said user input device, changes a word sense which is compared with information on each category included in said cross lingual word sense-based classification knowledge file based on the entered selection information to assign a category to the text to be classified.

4. A text classification apparatus according to claim 1, further comprising a display device, and a user input device for accepting an entry from a user, wherein: said processing unit compares a first word sense included in said cross lingual word sense-based classification knowledge file or said word-based classification knowledge file for the category assigned to the text to be classified with a second word sense resulting from a conversion of a word included in the text to be classified by said concept thesaurus to extract contradictory word senses, and said display device displays the first and second word senses for the extracted word, and receives information entered for selecting one of said first and second word senses through said user input device; and said text classification apparatus changes a word sense corresponding to each category included in said cross lingual word sense-based classification knowledge file or said word-based classification knowledge file based on the entered selection information.

5. A text classification apparatus comprising:
a text input device for receiving an entered text;
a storage device for storing a concept thesaurus file for use in classifying an entered text to be classified, a cross lingual word sense knowledge file corresponding to a plurality of languages including a first and a second language, and a word-based classification knowledge file;

a processing unit for executing a classification of the entered text to be classified to assign a category to the text; and an output device for outputting the classification result, wherein:

said text input device receives an entered text to be classified in the first language, said processing unit is configured to:

extract a word from said first text to be classified;

convert the extracted word into a word sense using said concept thesaurus file;

compare the word sense resulting from the conversion with information on each category included in said cross lingual word sense-based classification knowledge file to calculate a first score for each category;

compare the extracted word with word-based classification information included in said word-based classification knowledge file to calculate a second score for each category; and integrate said first and second scores for each category to determine a category for the first text to be classified in the first language for assigning a category to the first text, and said word-based classification knowledge file is generated by extracting information indicative of a relation between a plurality of words from a labeled text in the first language, and extracting a word-based classification knowledge of each category using the extracted information on the relation between words, and word classification information on each category included in said cross lingual word sense-based classification knowledge file.

6. A text classification apparatus according to claim 5, wherein:

said cross lingual word sense-based classification knowledge file is generated by extracting a word included in a text in the second language with category information, converting the extracted word into a word sense using said concept thesaurus, and learning a word sense-based classification knowledge using the word sense and category information of the labeled text in the second language.

7. A text classification apparatus according to claim 5, further comprising a display device, and a user input device for accepting an entry from a user, wherein:

said display device displays a word sense used in the assignment of a category, and displays together word sense candidates other than the word sense used in the assignment of a category when a plurality of word sense candidates exist for a single word extracted from the text to be classified; and receives information entered for selecting one of the plurality of word sense candidates through said user input device, changes a word sense which is compared with information on each category included in said cross lingual word sense-based classification knowledge file based on the entered selection information to assign a category to the text to be classified.

8. A text classification apparatus according to claim 5, further comprising a display device, and a user input device for accepting an entry from a user, wherein:

said processing unit compares a first word sense included in said cross lingual word sense-based classification knowledge file or said word-based classification knowledge file for the category assigned to the text to be classified with a second word sense resulting from a conversion of a word included in the text to be classified by said concept thesaurus to extract contradictory word senses, and said display device displays the first and second word senses for the extracted word, and receives information entered for selecting one of said first and second word senses through said user input device; and said text classification apparatus changes a word sense corresponding to each category included in said cross lingual word sense-based classification knowledge file or said word-based classification knowledge file based on the entered selection information.

9. A method of assigning a category to a text to be classified, said text being entered into a text classification apparatus having a storage device for storing a concept thesaurus file for use in classifying an entered text to be classified, a cross lingual word sense knowledge file corresponding to a plurality of languages including a first and a second language, and a word-based classification knowledge file, and a processing unit for executing a classification of the entered text to be classified to assign a category to the text, said method comprising the steps of:

receiving a text in the first language entered for classification;

extracting a word from the text to be classified in the first language;

converting the extracted word into a word sense using said concept thesaurus file;

comparing the word sense resulting from the conversion with information on each category included in said cross lingual word sense-based classification knowledge file to calculate a first score for each category;

comparing the extracted word with word-based classification information included in said word-based classification knowledge file to calculate a second score for each category; and integrating said first and second scores for each category to determine a category for the text to be classified in the first language for assigning a category to the text to be classified, and said word-based classification knowledge file being generated by learning a word-based classification knowledge using words included in the labeled text in the first language, wherein:

said text to be classified which has been assigned the category by said text classification apparatus is used for learning the word-based classification knowledge as the labeled text in the first language used in the production of said word-based classification knowledge file.

10. A method according to claim 9, wherein:

said cross lingual word sense-based classification knowledge file is generated by extracting a word included in a labeled text in the second language, converting the extracted word into a word sense using said concept thesaurus file, and learning the word sense-based classification knowledge using said word sense and category information on the labeled text in the second language.

11. A text classification method according to claim 9, wherein said text classification apparatus further has a display device, and a user input device for accepting an entry from a user, said method further comprising the steps of:

displaying a word sense used in the assignment of a category on said display device;

displaying together word sense candidates other than the word sense used in the assignment of a category when a plurality of word sense candidates exist for a single word extracted from the text to be classified;

receiving information entered for selecting one of the plurality of word sense candidates through said user input device; and changing a word sense which is compared with information on each category included in said cross lingual word sense-based classification knowledge file based on the entered selection information to assign a category.

12. A method according to claim 9, wherein said text classification apparatus further has a display device, and a user input device for accepting an entry from a user, said method further comprising the steps of:

comparing a first word sense included in said cross lingual word sense-based classification knowledge file or said word-based classification knowledge file for the category assigned to the text to be classified with a second word sense resulting from a conversion of a word included in the text to be classified by said concept thesaurus to extract contradictory word senses;

displaying the first and second word senses for the extracted word, and receiving information entered for selecting one of said first and second word senses through said user input device; and changing a word sense corresponding to each category included in said cross lingual word sense-based classification knowledge file or said word-based classification knowledge file based on the entered selection information.

* * * * *